United States Patent
Hong et al.

(10) Patent No.: US 12,308,658 B2
(45) Date of Patent: May 20, 2025

(54) WIRELESS POWER TRANSMITTER, WIRELESS POWER RECEIVER, AND METHOD FOR WIRELESSLY TRANSMITTING POWER

(71) Applicant: Samsung Electronics Co., Ltd., Suwon-si (KR)

(72) Inventors: Jongchul Hong, Suwon-si (KR); Jungsu Park, Suwon-si (KR); Yongjun Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 32 days.

(21) Appl. No.: 18/178,852

(22) Filed: Mar. 6, 2023

(65) Prior Publication Data

US 2023/0402876 A1    Dec. 14, 2023

Related U.S. Application Data

(63) Continuation of application No. PCT/KR2023/002938, filed on Mar. 3, 2023.

(30) Foreign Application Priority Data

Jun. 10, 2022 (KR) .................. 10-2022-0070626
Jul. 1, 2022 (KR) .................. 10-2022-0081270

(51) Int. Cl.
*H02J 50/12* (2016.01)
*H02J 7/00* (2006.01)
*H02J 50/80* (2016.01)

(52) U.S. Cl.
CPC ............ *H02J 50/12* (2016.02); *H02J 7/0049* (2020.01); *H02J 50/80* (2016.02)

(58) Field of Classification Search
CPC .................................. H02J 50/12; H02J 50/80
(Continued)

(56) References Cited

U.S. PATENT DOCUMENTS

2014/0159508 A1\* 6/2014 Sankar ............... H02J 7/00036
307/149
2015/0349540 A1   12/2015 Lee
(Continued)

FOREIGN PATENT DOCUMENTS

CN    108494030 A    9/2018
CN    112242725 B    1/2021
(Continued)

OTHER PUBLICATIONS

International Search Report and Written Opinion dated Jun. 7, 2023, issued in International Patent Application No. PCT/KR2023/002938.

(Continued)

*Primary Examiner* — Daniel Cavallari
*Assistant Examiner* — Dru M Parries
(74) *Attorney, Agent, or Firm* — Jefferson IP Law, LLP

(57) ABSTRACT

A wireless power transmission device is provided. The wireless power transmission device includes a power input circuit, a communication module, a transmission coil, a power output circuit configured to apply output power to the transmission coil, and a processor. The processor may be configured to identify that a first input power is received from a first external power source through a first power input circuit, control the communication module to transmit first rating information corresponding to the first input power to the wireless power reception device, control the at least one communication module to receive, from the wireless power reception device, information on a first charging current determined based on the first rating information in the (Continued)

wireless power reception device, and control the power output circuit so that a first output power is applied to the transmission coil, based on the information on the first charging current.

20 Claims, 11 Drawing Sheets

(58) Field of Classification Search
USPC .......................................................... 307/104
See application file for complete search history.

(56) References Cited

U.S. PATENT DOCUMENTS

| | | | |
|---|---|---|---|
| 2016/0043566 A1* | 2/2016 | Terao | H02J 50/70 |
| | | | 307/104 |
| 2017/0063140 A1 | 3/2017 | Lee et al. | |
| 2017/0364114 A1 | 12/2017 | Sporck et al. | |
| 2019/0036372 A1 | 1/2019 | Wang | |
| 2019/0250658 A1 | 8/2019 | Hsieh et al. | |
| 2019/0305580 A1 | 10/2019 | Lee et al. | |
| 2021/0242717 A1 | 8/2021 | Lee et al. | |
| 2022/0115915 A1 | 4/2022 | Lin et al. | |
| 2022/0376558 A1* | 11/2022 | Choi | H02J 50/10 |

FOREIGN PATENT DOCUMENTS

| | | |
|---|---|---|
| CN | 113541229 A | 10/2021 |
| EP | 3 462 564 A1 | 4/2019 |
| EP | 3 493 361 A1 | 6/2019 |
| JP | 2016-019366 A | 2/2016 |
| KR | 10-2015-0139288 A | 12/2015 |
| KR | 10-2016-0110023 A | 9/2016 |
| KR | 10-2017-0025484 A | 3/2017 |
| KR | 10-2018-0016134 A | 2/2018 |
| KR | 10-2019-0029055 A | 3/2019 |

OTHER PUBLICATIONS

European Search report dated Mar. 7, 2025, issued in European Application No. 23819952.5.

* cited by examiner

| Input Voltage | Input Current | RX Max Load SET |
|---|---|---|
| 5V | Unknown | 0.3A |
| | 0.5A | 0.3A |
| | 0.9A | 0.54A |
| | 1.0A | 0.6A |
| | 1.5A | 0.9A |
| | 2.0A | 1.2A |
| | 3.0A | 1.8A |

FIG.9

| Header | COM | Value | Packet types | Match |
|---|---|---|---|---|
| 0x28 | 0x06 | 0x00 | WPC_SET | Default |
| | | 0x05 | | 5V(5W) |
| | | 0x2C | | 9V(7.5W) |
| | | 0x4B | | 12V(12W) |
| | | 0x69 | | 15V(15W) |
| | 0x21 | 0x00 | Request_Guranteed Power | |

FIG.10

| COM | Value | Packet types | Match |
|---|---|---|---|
| 0x0A | 0x14 | SET RX_Pow | 2W |
| | 0x1E | | 3W |
| | 0x32 | | 5W |
| | 0x41 | | 6.5W |
| | 0x4B | | 7.5W |
| | 0x64 | | 10W |
| | 0x78 | | 12W |
| | 0x96 | | 15W |
| | 0xAF | | 17.5W |
| | 0xC8 | | 20W |
| 0x0C | 0x14 | Guaranteed Power | 2W |
| | 0x1E | | 3W |
| | 0x32 | | 5W |
| | 0x41 | | 6.5W |
| | 0x4B | | 7.5W |
| | 0x64 | | 10W |
| | 0x78 | | 12W |
| | 0x96 | | 15W |
| | 0xAF | | 17.5W |
| | 0xC8 | | 20W |

FIG.11

WIRELESS POWER TRANSMITTER, WIRELESS POWER RECEIVER, AND METHOD FOR WIRELESSLY TRANSMITTING POWER

CROSS-REFERENCE TO RELATED APPLICATION(S)

This application is a continuation application, claiming priority under § 365(c), of an International application No. PCT/KR2023/002938, filed on Mar. 3, 2023, which is based on and claims the benefit of a Korean patent application number filed on Jun. 10, 2022, in the Korean Intellectual Property Office, and of a Korean patent application number 10-2022-0081270, filed on Jul. 1, 2022, in the Korean Intellectual Property Office, the disclosure of each of which is incorporated by reference herein in its entirety.

TECHNICAL FIELD

The disclosure relates to a wireless power transmission device, a wireless power reception device, and a method for wirelessly transmitting power.

BACKGROUND ART

The wireless power transmission technology employs a method for transferring power by using an electromagnetic field induced in a coil, and may supply electric energy by applying a current to a transmission coil to generate an electromagnetic field, and generating an induced current in a reception coil by the generated electromagnetic field.

A wireless power transmission device may receive power from various external power sources via various interfaces. The wireless power transmission device may wirelessly transmit power to a wireless power reception device, based on the power received from an external power source.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Solution

An aspect of the disclosure is to provide a wireless power transmission device, a wireless power reception device, and a method for wirelessly transmitting power.

Additional aspects will be set forth in part in the description which follows and, in part, will be apparent from the description, or may be learned by practice of the presented embodiments.

In accordance with an aspect of the disclosure, a wireless power transmission device configured to wirelessly transmit power to a wireless power reception device is provided. The wireless power transmission device includes at least one power input circuit configured to receive input power from an external power source, at least one communication module, a transmission coil configured to wirelessly transmit the power, a power output circuit configured to apply output power to the transmission coil, and at least one processor. The at least one processor may be configured to identify that a first input power is received from a first external power source through a first power input circuit among the at least one power input circuit. The at least one processor may be configured to control the at least one communication module to transmit first rating information corresponding to the first input power to the wireless power reception device. The at least one processor may be configured to control the at least one communication module to receive, from the wireless power reception device, information on a first charging current determined based on the first rating information in the wireless power reception device. The at least one processor may be configured to control the power output circuit so that a first output power is applied to the transmission coil, based on the information on the first charging current.

In accordance with another aspect of the disclosure, a method of operating a wireless power transmission device configured to wirelessly transmit power to a wireless power reception device is provided. The method may include identifying that a first input power is received from a first external power source through a first power input circuit of the wireless power transmission device. The method may include controlling at least one communication module of the wireless power transmission device to transmit first rating information corresponding to the first input power to the wireless power reception device. The method may include controlling the at least one communication module to receive, from the wireless power reception device, information on a first charging current determined based on the first rating information in the wireless power reception device. The method may include controlling a power output circuit of the wireless power transmission device so that a first output power is applied to a transmission coil of the wireless power transmission device, based on the information on the first charging current.

In accordance with another aspect of the disclosure, a computer-readable recording medium storing instructions configured to perform at least one operation by at least one processor of a wireless power transmission device configured to wirelessly transmit power to a wireless power reception device is provided. The at least one operation may include identifying that a first input power is received from a first external power source through a first power input circuit of the wireless power transmission device. The at least one operation may include controlling at least one communication module of the wireless power transmission device to transmit first rating information corresponding to the first input power to the wireless power reception device. The at least one operation may include controlling the at least one communication module to receive, from the wireless power reception device, information on a first charging current determined based on the first rating information in the wireless power reception device. The at least one operation may include controlling a power output circuit of the wireless power transmission device so that a first output power is applied to a transmission coil of the wireless power transmission device, based on the information on the first charging current.

In accordance with another aspect of the disclosure, a wireless power reception device configured to wirelessly receive power from a wireless power transmission device is provided. The wireless power reception device may include a reception coil configured to receive the power, a power reception circuit configured to convert the received power into charging power, a charger circuit configured to receive the charging power, at least one communication module, and at least one processor. The at least one processor may be configured to control the at least one communication module to receive first rating information from the wireless power transmission device. The at least one processor may be configured to determine a first charging current of the charging power to be transferred to the charger circuit, based on the first rating information. The at least one processor may be configured to control the at least one communication module to transmit information on the first charging current to the wireless power transmission device. The at least one processor may be configured to receive a first power transmitted based on the information on the first charging current from the wireless power transmission device, through the reception coil.

In accordance with another aspect of the disclosure, a method of operating a wireless power reception device configured to wirelessly receive power from a wireless power transmission device is provided. The method may include controlling at least one communication module of the wireless power reception device to receive first rating information from the wireless power transmission device. The method may include determining a first charging current of charging power to be transferred to a charger circuit of the wireless power reception device, based on the first rating information. The method may includes controlling the at least one communication module to transmit information on the first charging current to the wireless power transmission device. The method may include receiving a first power transmitted based on the information on the first charging current from the wireless power transmission device, through a reception coil of the wireless power reception device.

In accordance with another aspect of the disclosure, a computer-readable recording medium storing instructions configured to perform at least one operation by at least one processor of a wireless power reception device configured to wirelessly receive power from a wireless power transmission device is provided. The at least one operation may include controlling at least one communication module of the wireless power reception device to receive first rating information from the wireless power transmission device. The at least one operation may include determining a first charging current of charging power to be transferred to a charger circuit of the wireless power reception device, based on the first rating information. The at least one operation may include controlling the at least one communication module to transmit information on the first charging current to the wireless power transmission device. The at least one operation may include receiving a first power transmitted based on the information on the first charging current from the wireless power transmission device, through a reception coil of the wireless power reception device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 9 illustrates rating information and a charging current according to an embodiment of the disclosure;

FIG. 10 illustrates a packet transmitted from a wireless power reception device according to an embodiment of the disclosure; and FIG. 11 illustrates a packet transmitted from a wireless power transmission device according to an embodiment of the disclosure.

Throughout the drawings, it should be noted that like reference numbers are used to depict the same or similar elements, features, and structures.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
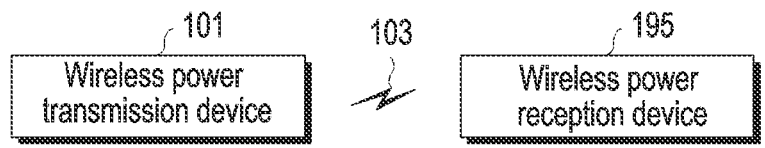
FIG. 1 is a block diagram illustrating a wireless power transmission device and a wireless power reception device according to an embodiment of the disclosure.

FIG. 1 is a block diagram illustrating a wireless power transmission device and a wireless power reception device according to an embodiment of the disclosure.

Referring to FIG. 1, a wireless power transmission device 101 according to an embodiment may wirelessly transmit power 103 to a wireless power reception device 195. The wireless power transmission device 101 may transmit the power 103 to the wireless power reception device 195 according to various charging schemes. For example, the wireless power transmission device 101 may transmit the power 103 according to an inductive coupling scheme (e.g., a magnetic induction scheme or a resonance induction scheme). According to an embodiment of the disclosure, when the wireless power transmission device 101 uses a magnetic induction scheme, the wireless power transmission device 101 may include, for example, a power source, a direct current-alternating current conversion circuit, an amplifier circuit, an impedance matching circuit, at least one capacitor, at least one coil, and/or a communication modulation/demodulation circuit. The at least one capacitor may configure a resonant circuit together with the at least one coil. In an embodiment of the disclosure, the wireless power transmission device 101 may implement at least a part of a scheme defined in the wireless power consortium (WPC) standard (or Qi standard). When the wireless power transmission device 101 uses the magnetic induction scheme, the wireless power transmission device 101 may perform communication according to an in-band scheme. When the wireless power transmission device 101 uses the magnetic induction scheme, the wireless power transmission device 101 may perform communication according to an out-band scheme. According to an embodiment of the disclosure, the wireless power transmission device 101 may transmit the power 103 according to a resonance induction scheme. In the case of using the resonance induction scheme, the wireless power transmission device 101 may include, for example, a power source, a direct current-alternating current conversion circuit, an amplifier circuit, an impedance matching circuit, at least one capacitor, at least one coil, and/or an out-band communication circuit (e.g., a Bluetooth low energy (BLE) communication circuit). The at least one capacitor and the at least one coil may configure a resonant circuit. In an embodiment of the disclosure, the wireless power transmission device 101 may implement at least a part of a scheme defined in the alliance for wireless power (A4WP) standard (or air fuel alliance (AFA) standard). The wireless power transmission device 101 may include a coil capable of generating a magnetic field when a current flows according to the resonance induction scheme or the magnetic induction scheme. An operation in which the wireless power transmission device 101 generates a magnetic field may be expressed as that the wireless power transmission device 101 wirelessly transmits the power 103. In an embodiment of the disclosure, the wireless power reception device 195 may include a coil in which an induced electromotive force is generated by a magnetic field in which a size thereof is changed according to time and which is formed in the surroundings thereof. An operation of generating an induced electromotive force through the coil may be expressed as that the wireless power reception device 195 wirelessly receives the power 103.

The wireless power transmission device 101 according to an embodiment may communicate with the wireless power reception device 195. For example, the wireless power transmission device 101 may communicate with the wireless power reception device 195 by using at least one coil for wireless charging and/or a frequency range for transmission of wireless power according to the in-band scheme. The wireless power transmission device 101 or the wireless power reception device 195 may change a load (or impedance) according to, for example, an on/off keying scheme. The wireless power transmission device 101 or the wireless power reception device 195 may determine data transmitted from a counterpart device by measuring a load change (or impedance change), based on a change in the magnitude of a current, a voltage, or power of the coil. According to the in-band scheme, performing an operation of determining data transmitted from a counterpart device may be expressed as receiving data from the counterpart device. For example, the wireless power transmission device 101 may communicate with the wireless power reception device 195 according to the out-band scheme. The wireless power transmission device 101 or the wireless power reception device 195 may transmit or receive data by using a communication circuit (e.g., a BLE/ZigBee communication module) provided separately from a patch antenna or the coil.

Herein, performing a specific operation by the wireless power transmission device 101 or the wireless power reception device 195 may refer to performing a specific operation by various hardware included in the wireless power transmission device 101 or the wireless power reception device 195, for example, a control circuit such as a processor (for example, a transmission IC and/or a micro controlling unit (MCU)), or a coil. Alternatively, performing a specific operation by the wireless power transmission device 101 or the wireless power reception device 195 may also mean that the processor controls other hardware to perform a specific operation. Alternatively, performing a specific operation by the wireless power transmission device 101 or the wireless power reception device 195 may also refer to causing the processor or other hardware to perform a specific operation as an instruction for performing a specific operation stored in a storage circuit (e.g., a memory) of the wireless power transmission device 101 or the wireless power reception device 195 is executed.

Figure 2:
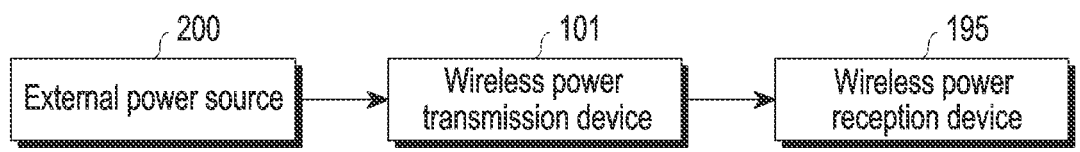
FIG. 2 illustrates a device included in a wireless power transmission system according to an embodiment of the disclosure.

FIG. 2 illustrates a device included in a wireless power transmission system according to an embodiment of the disclosure.

Referring to FIG. 2, a wireless power transmission system may include an external power source 200, the wireless power transmission device 101, and the wireless power reception device 195. The external power source 200 may be a device configured by an interface including a travel adapter (TA) or a universal serial bus (USB). The external power source 200 is not limited to the above-described devices. The wireless power reception device 195 may include a portable communication device (e.g., a smart phone), a computer device, a portable multimedia device, a portable medical device, a camera, a wearable device, or a home appliance device. The wireless power reception device 195 is not limited to the above-described devices.

According to an embodiment of the disclosure, the wireless power transmission device 101 may receive input power from the external power source 200. For example, the wireless power transmission device 101 may receive input power from the external power source 200 by a wire (e.g., through a wired interface (TA or USB3.0)). The wireless power transmission device 101 and the external power source 200 may transmit and receive a signal by a wire. Alternatively, the wireless power transmission device 101 may wirelessly receive power from the external power source 200. The wireless power transmission device 101 and the external power source 200 may wirelessly transmit and receive a signal.

According to an embodiment of the disclosure, the wireless power transmission device 101 may wirelessly transmit power to the wireless power reception device 195, based on the input power received from the external power source 200. The wireless power transmission device 101 and the wireless power reception device 195 may wirelessly communicate with each other. The wireless power transmission device 101 may transmit power to the wireless power reception device 195, based on a communication signal received from the wireless power reception device 195.

Figure 3A:
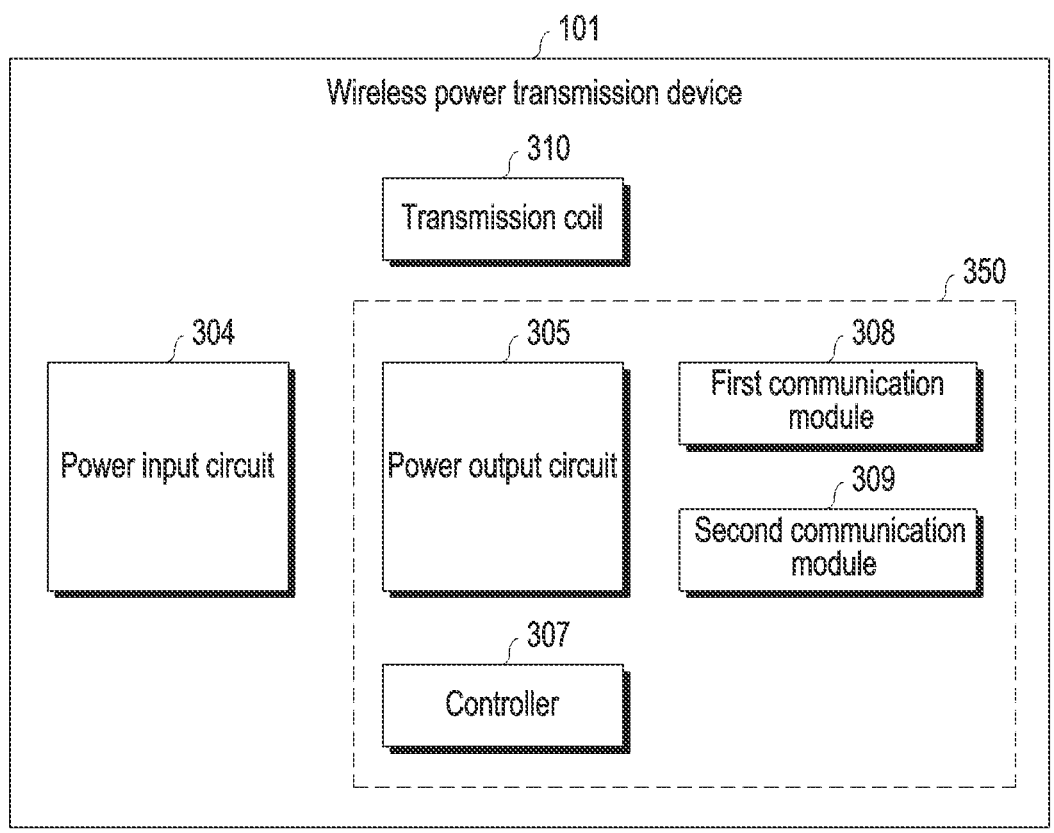
FIG. 3A is a block diagram illustrating a wireless power transmission device according to an embodiment of the disclosure.

FIG. 3A is a block diagram illustrating a wireless power transmission device according to an embodiment of the disclosure.

Referring to FIG. 3A, the wireless power transmission device 101 may include a power input circuit 304, a power output circuit 305, a controller 307, a transmission coil 310, a first communication module 308, and a second communication module 309.

According to an embodiment of the disclosure, the wireless power transmission device 101 may include only one communication module among the first communication module 308 or the second communication module 309. According to an embodiment of the disclosure, the controller 307 may control the first communication module 308 and/or the second communication module 309.

According to an embodiment of the disclosure, the first communication module 308 may be a communication module for in-band communication. For example, the wireless power transmission device 101 may perform in-band communication with the wireless power reception device 195, through the first communication module 308. For example, the first communication module 308 may include a modulation/demodulation circuit for in-band communication. For example, the wireless power transmission device 101 may demodulate a signal (e.g., a modulation signal by amplitude shift keying (ASK) or frequency shift keying (FSK)) from the wireless power reception device 195 by using the first communication module 308. Although the first communication module 308 is described as a separate component from other components (e.g., the transmission coil 310 and the power output circuit 305) of the wireless power transmission device 101, the first communication module 308 may be referred to as including other components (e.g., the transmission coil 310 and the power output circuit 305). For example, an operation of controlling the first communication module 308 so that the wireless power transmission device 101 transmits an in-band communication signal may be understood as an operation in which the wireless power transmission device 101 controls the power output circuit 305 to modulate a frequency or an amplitude of power output through the transmission coil 310, so as to transmit a signal to the wireless power reception device 195.

According to an embodiment of the disclosure, the second communication module 309 may be a communication module for out-band communication. For example, the wireless power transmission device 101 may perform out-band communication with the wireless power reception device 195, through the second communication module 309. For example, the second communication module 309 may be a BLE communication module, a ZigBee communication module, or an NFC communication module, and the type of the second communication module 309 is not limited. According to an embodiment of the disclosure, the power input circuit 304 may receive input power from an external power source (e.g., the external power source 200 of FIG. 2). The power input to the power input circuit 304 from the external power source (e.g., the external power source 200 of FIG. 2) may be referred to as "input power". The power input circuit 304 may receive input power by a wire from the external power source (e.g., the external power source 200 of FIG. 2). The wireless power transmission device 101 and the external power source 200 may transmit and receive a signal by a wire through the power input circuit 304. For example, the power input circuit 304 may be implemented in accordance with the battery charging (BC) 1.2 or power delivery (PD) standard which is the USB fast charging standard, but the type of the power input circuit 304 is not limited. For example, the wireless power transmission device 101 may receive input power and/or a signal from the external power source 200, through the power input circuit 304, according to the USB Type-C standard or the USB Type-A standard, but there is no limitation to the standards. The power input circuit 304 may provide power to the power output circuit 305, based on the input power received from the external power source (e.g., the external power source 200 of FIG. 2).

According to an embodiment of the disclosure, the power output circuit 305 may include an inverter configured to apply alternating current power to the transmission coil 310. The inverter of the power output circuit 305 may convert direct current power into alternating current power to apply the converted alternating current power to the transmission coil 310. The power output circuit 305 may apply alternating current power to the transmission coil 310, based on the power provided from the power input circuit 304. The wireless power transmission device 101 may transmit power to the wireless power reception device 195 through the transmission coil 310.

According to an embodiment of the disclosure, the controller 307 may control the inverter of the power output circuit 305 so that a signal is applied to the transmission coil 310. For example, the controller 307 may apply a pulse (for example, a gate driving signal) to the inverter of the power output circuit 305, or control other hardware (for example, a gate driver) so that the pulse is applied. Although only the transmission coil 310 is shown in FIG. 3A, those skilled in the art will understand that at least one capacitor may be further connected to the transmission coil 310.

According to an embodiment of the disclosure, the controller 307 may perform at least one operation for providing power to the wireless power reception device 195. The controller 307 may perform at least one operation for providing information to the wireless power reception device 195. The controller 307 may perform at least one operation for identifying information from the wireless power reception device 195. The controller 307 may be a controller capable of performing at least a part of the operations of the wireless power transmission device 101, and may be referred to as a controller or a processor. The controller 307 may be implemented as a dedicated controller only for wireless charging, but may be implemented as one with a main processor which manages the overall operations of the wireless power transmission device 101 in some cases. Those skilled in the art will understand that the controller 307 is not limited as long as the controller has the capability of processing at least a part of the operations of the wireless power transmission device 101. The controller 307 may be implemented as a logic element such as a comparator.

According to an embodiment of the disclosure, the power output circuit 305, the controller 307, the first communication module 308, and the second communication module 309 may be implemented as one integrated circuit (IC) 350. Alternatively, the IC 350 may include the power output circuit 305 and the controller 307, and may include only one communication module among the first communication module 308 or the second communication module 309. According to another embodiment of the disclosure, the power input circuit 304 and the controller 307 may be implemented as one integrated circuit (IC).

Figure 3B:
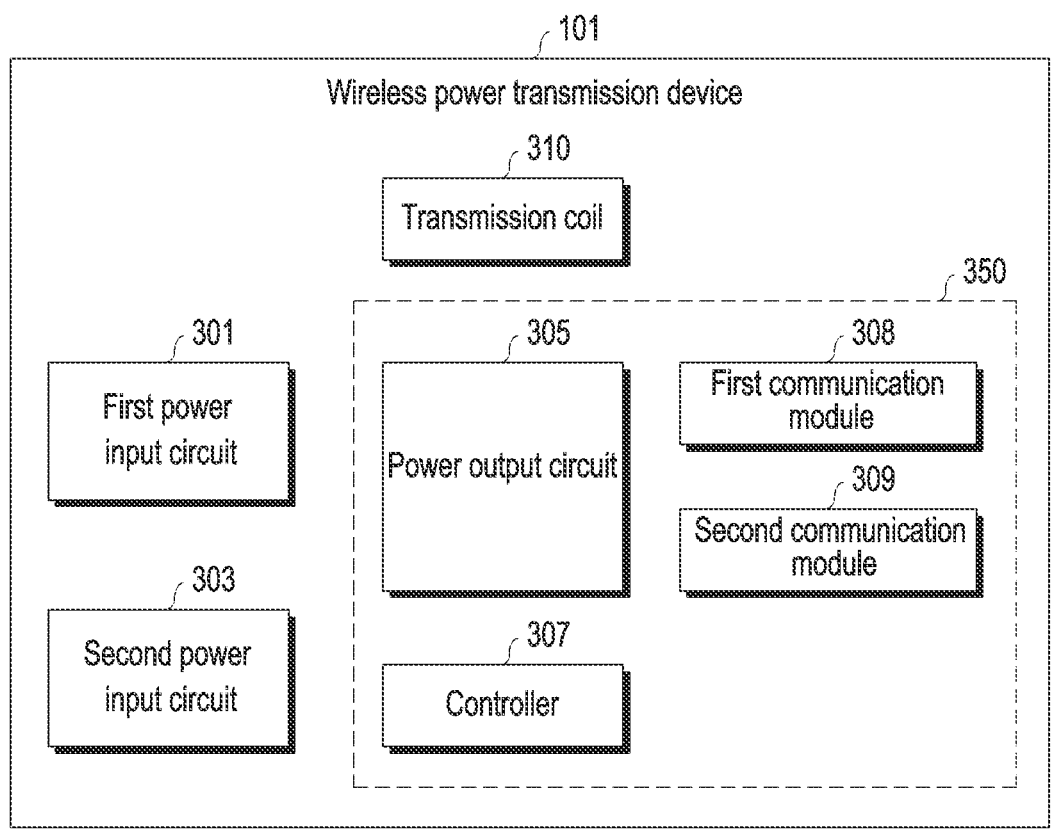
FIG. 3B is a block diagram illustrating a wireless power transmission device according to an embodiment of the disclosure.

FIG. 3B is a block diagram illustrating a wireless power transmission device according to an embodiment of the disclosure.

FIG. 3A illustrates an embodiment in which one power input circuit (e.g., 304) is included in the wireless power transmission device 101, and FIG. 3B illustrates an embodiment in which a plurality of power input circuits (e.g., 301 and 303) are included in the wireless power transmission device 101. Except that the wireless power transmission device 101 of FIG. 3B includes a plurality of power input circuits (e.g., 301 and 303) and the wireless power transmission device 101 of FIG. 3A includes one power input circuit (e.g., 304), the configuration of FIG. 3A and the configuration of FIG. 3B may be equally understood. Therefore, the description of FIG. 3B may be omitted to the extent that the description overlaps with the description of FIG. 3A.

Referring to FIG. 3B, the wireless power transmission device 101 may include a first power input circuit 301, a second power input circuit 303, the power output circuit 305, the controller 307, the transmission coil 310, the first communication module 308, and the second communication module 309. The first power input circuit 301 and the second power input circuit 303 may be different types of power input circuits. For example, one of the first power input circuit 301 and the second power input circuit 303 may be implemented in accordance with the power delivery (PD) standard, and the other one of the first power input circuit 301 and the second power input circuit 303 may be implemented in accordance with the battery charging (BC) 1.2 standard, but an implementation manner of the first power input circuit 301 and the second power input circuit 303 is not limited. Each of the first power input circuit 301 and the second power input circuit 303 may be understood similarly to the power input circuit 304 of FIG. 3A. For example, the power input circuit 304 of FIG. 3A may be the first power input circuit 301 or the second power input circuit 303. Although shown in FIG. 3B as including two power input circuits 301 and 303, this is exemplary and the number of power input circuits included in the wireless power transmission device 101 is not limited.

According to an embodiment of the disclosure, the power output circuit 305, the controller 307, the first communication module 308, and the second communication module 309 may be implemented as one integrated circuit (IC) 350. Alternatively, the IC 350 may include the power output circuit 305 and the controller 307, and may include only one communication module among the first communication module 308 or the second communication module 309. According to another embodiment of the disclosure, the first power input circuit 301 and the controller 307 may be implemented as one integrated circuit (IC). According to still another embodiment of the disclosure, the second power input circuit 303 and the controller 307 may be implemented as one integrated circuit (IC).

Although the controller 307 is shown as one component in FIG. 3A, this is only an example, and the controller 307 may refer to at least one controller included in the wireless power transmission device 101. For example, the wireless power transmission device 101 may include at least one of a first controller separate from the power output circuit 305 and the power input circuit 304, a second controller included in an IC including the power output circuit 305, and a third controller included in an IC including the power input circuit 304. In this case, the controller 307 may refer to the first controller, the second controller, and/or the third controller. Accordingly, the controller 307 may refer to at least one controller 307.

Similarly, even in FIG. 3B, the wireless power transmission device 101 may include at least one of a fourth controller separate from the power output circuit 305 and the power input circuit 304, a fifth controller included in the IC including the power output circuit 305, a sixth controller included in an IC including the first power input circuit 301, and a seventh controller included in an IC including the second power input circuit 303. In this case, the controller 307 may refer to the fourth controller, the fifth controller, the sixth controller, and/or the seventh controller. Accordingly, the controller 307 may refer to at least one controller 307.

Figure 4:
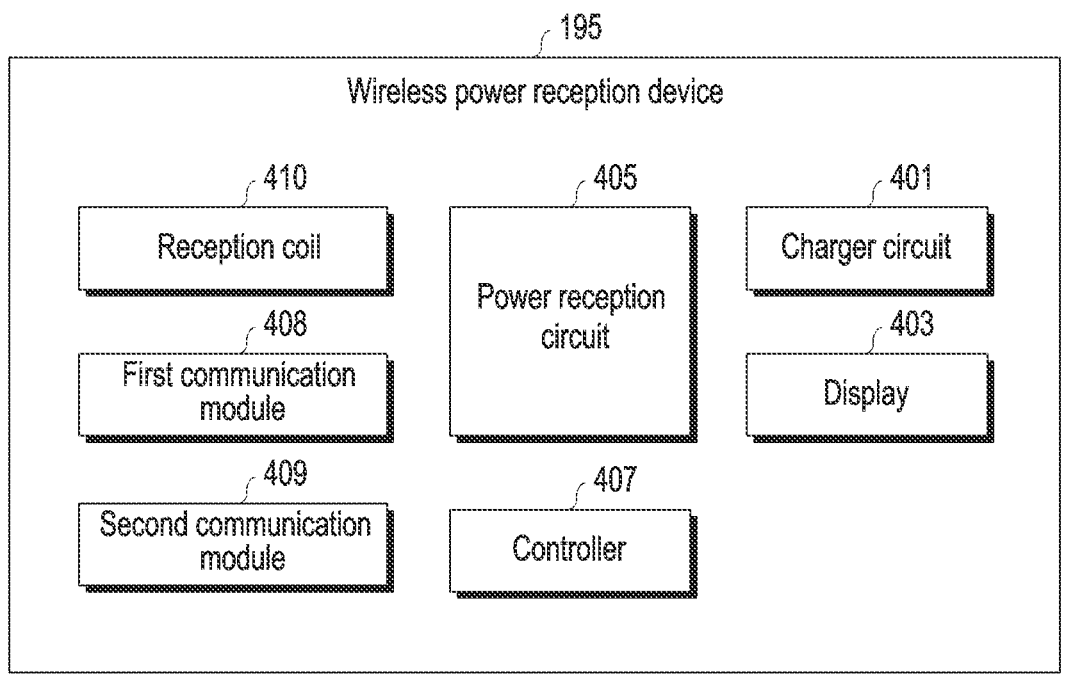
FIG. 4 is a block diagram illustrating a wireless power reception device according to an embodiment of the disclosure.

FIG. 4 is a block diagram illustrating a wireless power reception device according to an embodiment of the disclosure.

Referring to FIG. 4, the wireless power reception device 195 may include a charger circuit 401, a display 403, a power reception circuit 405, a controller 407, a first communication module 408, a second communication module 409, and a reception coil 410.

According to an embodiment of the disclosure, the wireless power reception device 195 may include only one communication module among the first communication module 408 or the second communication module 409. According to an embodiment of the disclosure, the controller 407 may control the first communication module 408 and/or the second communication module 409.

According to an embodiment of the disclosure, the first communication module 408 may be a communication module for in-band communication. For example, the wireless power reception device 195 may perform in-band communication with the wireless power transmission device 101, through the first communication module 408. For example, the first communication module 408 may include a plurality of capacitors and a plurality of switches connected to the plurality of capacitors, for in-band communication. For example, the wireless power reception device 195 may transmit a signal to the wireless power transmission device 101 by controlling a plurality of switches included in the first communication module 408 to change an impedance. For example, the wireless power reception device 195 may receive a signal (e.g., a signal in which a frequency or an amplitude of power output through the transmission coil 310 of the wireless power transmission device 101 is modulated) from the wireless power transmission device 101.

According to an embodiment of the disclosure, the second communication module 409 may be a communication module for out-band communication. For example, the wireless power reception device 195 may perform out-band communication with the wireless power transmission device 101, through the second communication module 409. For example, the second communication module 409 may be a BLE communication module, an NFC communication module, or a ZigBee communication module, and the type of the second communication module 409 is not limited.

According to an embodiment of the disclosure, the power reception circuit 405 may include a rectifier circuit and a regulator. The rectifier circuit of the power reception circuit 405 may convert alternating current power received through the reception coil 410 into direct current power. The controller 407 may control on/off states of a plurality of switches of the rectifier circuit of the power reception circuit 405 so that alternating current power can be converted into direct current power. The regulator of the power reception circuit 405 may perform conversion (for example, buck conversion and/or boost conversion) and/or regulation of a voltage of the rectified power output from the rectifier circuit. According to an embodiment of the disclosure, the regulator may be included in the power reception circuit 405 or may be included in the charger circuit 401. Alternatively, respective regulators may be included in the power reception circuit 405 and the charger circuit 401.

According to an embodiment of the disclosure, the charger circuit 401 may include a charger IC and a battery. The charger IC of the charger circuit 401 may charge the battery by using the power converted and/or regulated by the regulator. The charger IC of the charger circuit 401 may control a voltage and/or a current for charging the battery according to a charging mode (e.g., a constant current (CC) mode, a constant voltage (CV) mode, or a fast charge mode) of the battery. According to an implementation, a PMIC may be connected to the regulator in place of the charger IC of the charger circuit 401.

According to an embodiment of the disclosure, the controller 407 may perform at least one operation for receiving power from the wireless power transmission device 101. The controller 407 may perform at least one operation for providing information to the wireless power transmission device 101. The controller 407 may perform at least one operation for identifying information from the wireless power transmission device 101. The controller 407 may be a controller capable of performing at least a part of the operations of the wireless power reception device 195, and may be referred to as a controller or a processor. The controller 407 may be implemented as a dedicated controller only for wireless charging, but may be implemented as one with a main processor which manages the overall operations of the wireless power reception device 195 in some cases. Those skilled in the art will understand that the controller 407 is not limited as long as the controller has the capability of processing at least a part of the operations of the wireless power reception device 195. The controller 407 may be implemented as a logic element such as a comparator. The controller 407 may be an application processor (AP) of the wireless power reception device 195. Alternatively, the wireless power reception device 195 may include the controller 407 and/or an AP.

According to an embodiment of the disclosure, the wireless power reception device 195 may control the display 403 to display a screen. The implementation form of the display 403 is not limited.

Figure 5:
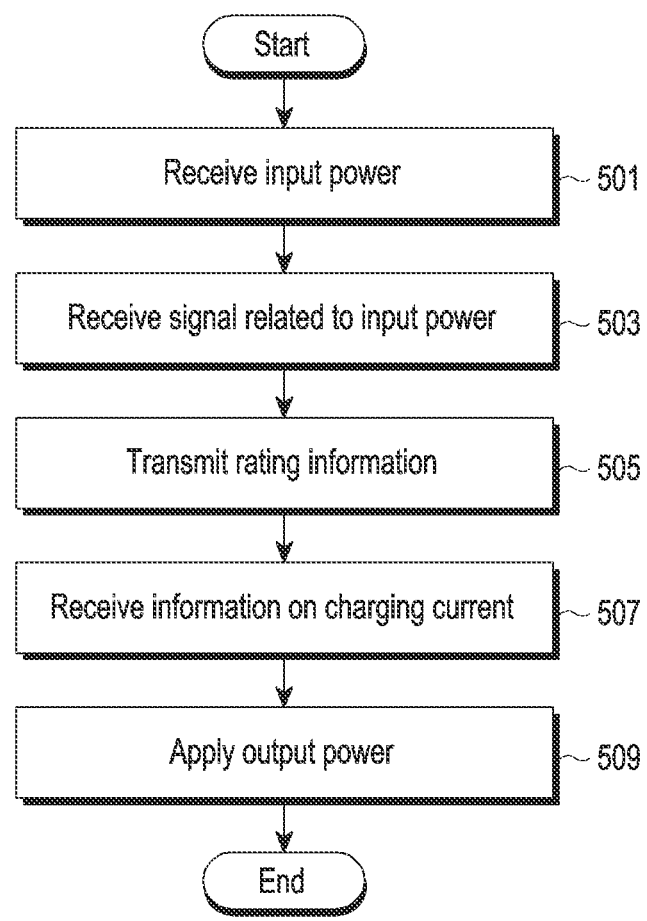
FIG. 5 is a flowchart illustrating a method of operating a wireless power transmission device according to an embodiment of the disclosure.

FIG. 5 is a flowchart illustrating a method of operating a wireless power transmission device according to an embodiment of the disclosure. FIG. 5 will be described with reference to FIGS. 2, 3A, 3B, and 4.

Referring to FIG. 5, in operation 501, according to an embodiment of the disclosure, the wireless power transmission device 101 (e.g., the controller 307) may receive input power from the external power source 200. The wireless power transmission device 101 may receive input power from the external power source 200 through the power input circuit 304. For example, the wireless power transmission device 101 may identify that the input power is received from the external power source 200 through the power input circuit 304.

In operation 503, according to an embodiment of the disclosure, the wireless power transmission device 101 may receive a signal related to the input power from the external power source 200. The "signal related to the input power" may be a signal including information on specification (e.g., a voltage and/or a current) of the input power input from the external power source 200. For example, the wireless power transmission device 101 may receive input power (e.g., input power in operation 501) from the external power source 200 through a first channel (e.g., a power channel), and receive a signal related to the input power from the external power source 200 through a second channel (e.g., a data channel). According to an embodiment of the disclosure, the signal related to the input power may be a signal (e.g., a negotiation signal for a power level, supplied from a USB Type-C standard power source) received through a line (e.g., a communication line of a USB port) of a port included in the power input circuit 304 (e.g., a PD IC). According to an embodiment of the disclosure, the signal related to the input power may be a signal (e.g., a signal related to a DCP mode or a signal related to a CDP mode) received through a line (e.g., a data line of a USB port) of a port included in the power input circuit 304 (e.g., an IC of BC1.2).

According to an embodiment of the disclosure, the wireless power transmission device 101 may identify rating information, based on a signal related to input power received from the external power source 200. For example, the power input circuit 304 may identify rating information, based on a signal related to input power received from the external power source 200. The "rating information" may be power information (e.g., voltage information and/or current information) corresponding to input power input to the wireless power transmission device 101. For example, when a voltage of the input power input to the wireless power transmission device 101 is 5V and a current thereof is 2 A, and the signal related to the input power is received from the external power source 200, the wireless power transmission device 101 may identify rating information of 5V and 2 A, based on the signal related to the input power. The description of the rating information will be described later with reference to FIG. 9.

According to an embodiment of the disclosure, operation 503 may be omitted. The external power source 200 may not transmit the signal related to the input power to the wireless power transmission device 101. The wireless power transmission device 101 may not receive the signal related to the input power from the external power source 200. The wireless power transmission device 101 may identify basic rating information as rating information, based on the signal related to the input power not being received through the power input circuit 304. The "basic rating information" may be information indicating that rating information is not identified, or rating information of a designated voltage (e.g., 5V) and a designated current (e.g., 0.5 A). For example, the basic rating information may be preconfigured to correspond to the power input circuit 304, regardless of the input power.

According to an embodiment of the disclosure, the power input circuit 304 may transmit a "signal including rating information" to the power output circuit 305 or the controller 307, based on input power (e.g., the input power in operation 501) and/or a signal (e.g., the signal related to the input power in operation 503) related to the input power. The signal including the rating information may be preconfigured to correspond to the rating information. For example, when first rating information is identified as the rating information corresponding to the input power, the power input circuit 304 may transmit a first signal (e.g., a first signal including the first rating information) corresponding to the first rating information to the power output circuit 305 or the controller 307, when second rating information is identified as the rating information corresponding to the input power, the power input circuit may transmit a second signal (e.g., a second signal including the second rating information) corresponding to the second rating information to the power output circuit 305 or the controller 307, and when the rating information corresponding to the input power is not identified, the power input circuit may transmit a third signal (e.g., a third signal indicating that rating information is not identified or a third signal including the basic rating information) to the power output circuit 305 or the controller 307.

For example, the first signal (e.g., a signal indicating TA_2.5 W) may be configured to correspond to the first rating information (e.g., information indicating that input power of 2.5 W is input through a TA), the second signal (e.g., a signal indicating TA_10 W) may be configured to correspond to the second rating information (e.g., information indicating that input power of 10 W is input through the TA), the third signal (e.g., a signal indicating OTG) may be configured to correspond to third rating information (e.g., information indicating that input power of 2.5 W is input through an on the go (OTG) protocol), and a fourth signal (e.g., a signal indicating fail) may be configured to correspond to the rating information not being identified. The above-described rating information and signal including the rating information are exemplary, and there is no limitation thereto.

According to an embodiment of the disclosure, the wireless power transmission device 101 may identify the rating information, based on the signal including the rating information transmitted from the power input circuit 304 to the controller 307 or the power output circuit 305.

In operation 505, according to an embodiment of the disclosure, the wireless power transmission device 101 may transmit the identified rating information (e.g., rating information corresponding to input power or basic rating information) to the wireless power reception device 195. For example, the wireless power transmission device 101 may control at least one communication module (e.g., the first communication module 308 and/or the second communication module 309) to transmit a signal including the identified rating information to the wireless power reception device 195. For example, an operation of controlling the first communication module 308 so that the wireless power transmission device 101 transmits a signal including the identified rating information to the wireless power reception device 195 may be understood as an operation in which the wireless power transmission device 101 controls the power output circuit 305 to modulate a frequency or an amplitude of power output through the transmission coil 310, so as to transmit a signal to the wireless power reception device 195.

In operation 507, according to an embodiment of the disclosure, the wireless power transmission device 101 may receive information on a charging current from the wireless power reception device 195. Alternatively, the wireless power transmission device 101 may receive a power request signal including the information on the charging current from the wireless power reception device 195. For example, the wireless power transmission device 101 may control at least one communication module (e.g., the first communication module 308 and/or the second communication module 309) to receive the information (or the power request signal including the information on the charging current) on the charging current from the wireless power reception device 195. The wireless power reception device 195 may determine the charging current, based on the rating information received from the wireless power transmission device 101. The "charging current" may be a maximum allowable current corresponding to the rating information. The wireless power reception device 195 (e.g., the controller 407 or an AP) may determine a charging current for charging a battery of the wireless power reception device 195, based on the rating information received from the wireless power transmission device 101. The wireless power reception device 195 may transmit the information on the charging current to the wireless power transmission device 101. Alternatively, the wireless power reception device 195 may transmit a power request signal including the information on the charging current to the wireless power transmission device 101. For example, the wireless power reception device 195 may control at least one communication module (e.g., the first communication module 408 and/or the second communication module 409) to transmit the information (or the power request signal including the information on the charging current) on the charging current to the wireless power transmission device 101.

In operation 509, according to an embodiment of the disclosure, the wireless power transmission device 101 may apply output power to the transmission coil 310, based on the information (or the power request signal including the information on the charging current) on the charging current received from the wireless power reception device 195. For example, the wireless power transmission device 101 may control the power output circuit 305 (e.g., an inverter of the power output circuit 305) so that the output power is applied to the transmission coil 310. According to an embodiment of the disclosure, the wireless power transmission device 101 may determine output power to be applied to the transmission coil 310, based on the information (or the power request signal including the information on the charging current) on the charging current received from the wireless power reception device 195. The wireless power transmission device 101 may transmit power to the wireless power reception device 195 by applying the determined output power to the transmission coil 310.

Figure 6:
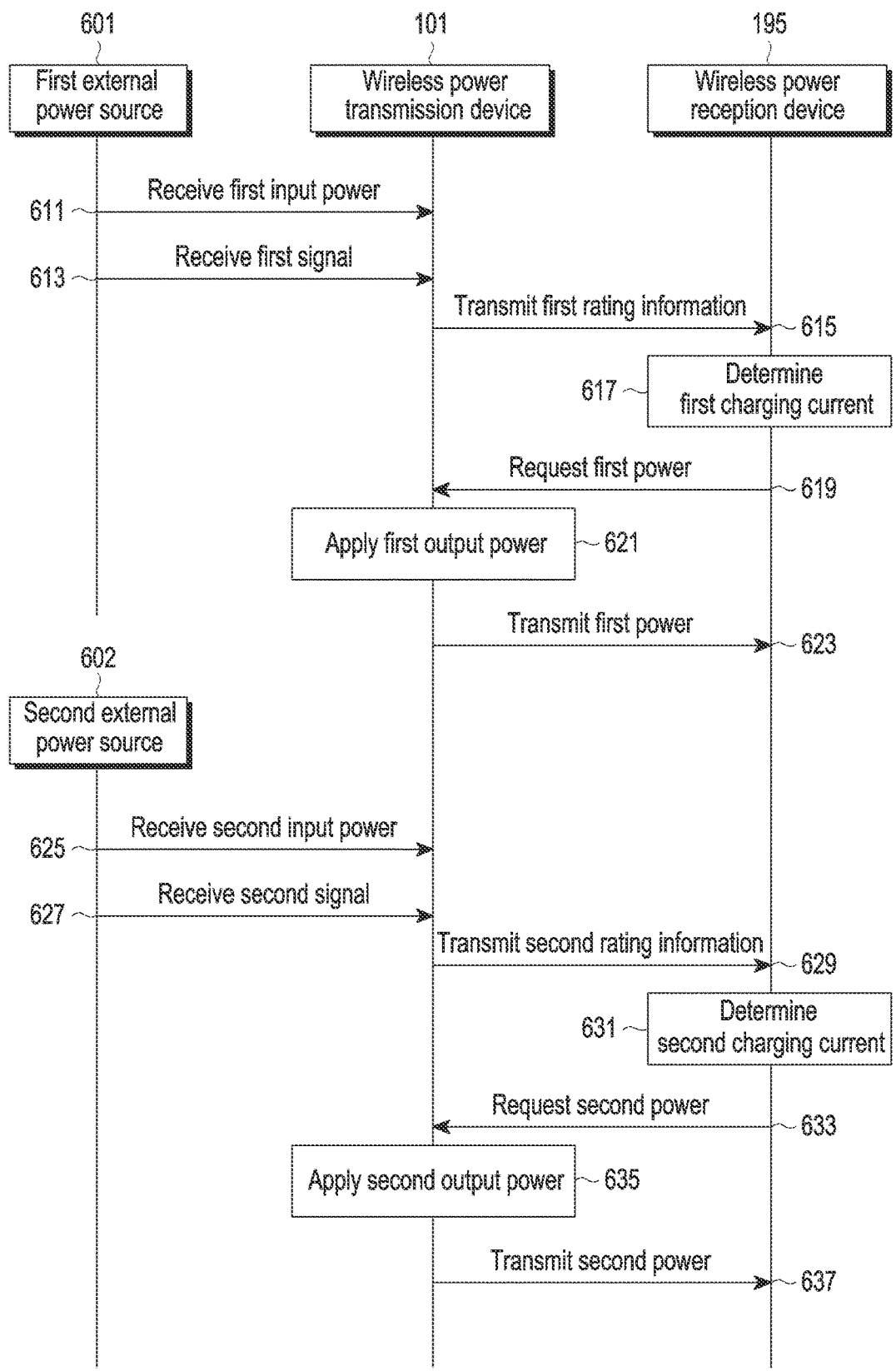
FIG. 6 is a flowchart illustrating a method of operating a device included in a wireless power transmission system according to an embodiment of the disclosure.

FIG. 6 is a flowchart illustrating a method of operating a device included in a wireless power transmission system according to an embodiment of the disclosure. FIG. 6 will be described with reference to FIGS. 2, 3A, 3B, 4, and 5.

Among the operations of FIG. 6, some descriptions of operations similar to the operations of FIG. 5 may be omitted, and the omitted descriptions may be understood similarly to the descriptions of FIG. 5.

A first external power source 601 and a second external power source 602 of FIG. 6 may be one type of the external power source 200 of FIG. 2.

Referring to FIG. 6, in operation 611, according to an embodiment of the disclosure, the wireless power transmission device 101 (e.g., the controller 307) may receive a first input power from the first external power source 601. The wireless power transmission device 101 may receive the first input power from the first external power source 601 through the first power input circuit 301 (e.g., a power input circuit implemented in accordance with the PD standard). The wireless power transmission device 101 may identify that the first input power is received from the first external power source 601 through the first power input circuit 301 (e.g., a power input circuit implemented in accordance with the PD standard).

In operation 613, according to an embodiment of the disclosure, the wireless power transmission device 101 may receive a first signal related to the first input power from the first external power source 601 through the first power input circuit 301 (e.g., a power input circuit implemented in accordance with the PD standard).

According to an embodiment of the disclosure, the wireless power transmission device 101 may identify first rating information corresponding to the first input power, based on the first signal related to the first input power. For example, the first power input circuit 301 (e.g., a power input circuit implemented in accordance with the PD standard) may identify the first rating information corresponding to the first input power, based on the first signal related to the first input power received from the first external power source 601.

According to an embodiment of the disclosure, the wireless power transmission device 101 may identify that the first input power is received through the first power input circuit 301 (e.g., a power input circuit implemented in accordance with the PD standard), based on a signal (e.g., a signal including the first rating information) transmitted from the first power input circuit 301 (e.g., a power input circuit implemented in accordance with the PD standard) to the power output circuit 305 or the controller 307. The wireless power transmission device 101 may identify that the first signal related to the first input power is received through the first power input circuit 301 (e.g., a power input circuit implemented in accordance with the PD standard), based on a signal (e.g., a signal including the first rating information) transmitted from the first power input circuit 301 (e.g., a power input circuit implemented in accordance with the PD standard) to the power output circuit 305 or the controller 307. The wireless power transmission device 101 may identify the first rating information corresponding to the first input power, based on a signal (e.g., a signal including the first rating information) transmitted from the first power input circuit 301 (e.g., a power input circuit implemented in accordance with the PD standard) to the power output circuit 305 or the controller 307.

In operation 615, according to an embodiment of the disclosure, the wireless power transmission device 101 may transmit the first rating information corresponding to the first input power to the wireless power reception device 195. For example, the wireless power transmission device 101 may control at least one communication module (e.g., the first communication module 308 and/or the second communication module 309) to transmit a signal including the first rating information to the wireless power reception device 195. The operation of controlling at least one communication module (e.g., the first communication module 308 and/or the second communication module 309) has been described above (e.g., operation 505).

In operation 617, according to an embodiment of the disclosure, the wireless power reception device 195 (e.g., the controller 407 or an AP) may determine a first charging current, based on the first rating information received from the wireless power transmission device 101. The first charging current may be a maximum allowable current for charging the battery of the wireless power reception device 195.

In operation 619, according to an embodiment of the disclosure, the wireless power reception device 195 may request a first power from the wireless power transmission device 101. For example, the wireless power reception device 195 may control at least one communication module (e.g., the first communication module 408 and/or the second communication module 409) to transmit information (or a first power request signal including information on the first charging current) on the first charging current to the wireless power transmission device 101.

In operation 621, according to an embodiment of the disclosure, the wireless power transmission device 101 may apply a first output power to the transmission coil 310, based on the information (or the first power request signal including the information on the first charging current) on the first charging current received from the wireless power reception device 195.

In operation 623, according to an embodiment of the disclosure, the wireless power transmission device 101 may transmit the first power to the wireless power reception device 195 by applying the first output power to the transmission coil 310.

According to an embodiment of the disclosure, the wireless power reception device 195 may charge the battery while satisfying a rated current, based on the first power received from the wireless power transmission device 101.

In operation 625, according to an embodiment of the disclosure, the wireless power transmission device 101 may receive a second input power from the second external power source 602. The wireless power transmission device 101 may receive the second input power from the second external power source 602 through the second power input circuit 303 (e.g., a power input circuit implemented in accordance with the BC1.2 standard). The wireless power transmission device 101 may identify that the second input power is received from the second external power source 602 through the second power input circuit 303 (e.g., a power input circuit implemented in accordance with the BC1.2 standard).

In operation 627, according to an embodiment of the disclosure, the wireless power transmission device 101 may receive a second signal related to the second input power from the second external power source 602 through the second power input circuit 303 (e.g., a power input circuit implemented in accordance with the BC1.2 standard).

According to an embodiment of the disclosure, the wireless power transmission device 101 may identify second rating information corresponding to the second input power, based on the second signal related to the second input power. For example, the second power input circuit 303 (e.g., a power input circuit implemented in accordance with the BC1.2 standard) may identify the second rating information corresponding to the second input power, based on the second signal related to the second input power received from the second external power source 602.

According to an embodiment of the disclosure, the wireless power transmission device 101 may identify that the second input power is received through the second power input circuit 303 (e.g., a power input circuit implemented in accordance with the BC1.2 standard), based on a signal (e.g., a signal including the second rating information) transmitted from the second power input circuit 303 (e.g., a power input circuit implemented in accordance with the BC1.2 standard) to the power output circuit 305 or the controller 307. The wireless power transmission device 101 may identify that the second signal related to the second input power is received through the second power input circuit 303 (e.g., a power input circuit implemented in accordance with the BC1.2 standard), based on a signal (e.g., a signal including the second rating information) transmitted from the second power input circuit 303 (e.g., a power input circuit implemented in accordance with the BC1.2 standard) to the power output circuit 305 or the controller 307. The wireless power transmission device 101 may identify the second rating information corresponding to the second input power, based on a signal (e.g., a signal including the second rating information) transmitted from the second power input circuit 303 (e.g., a power input circuit implemented in accordance with the BC1.2 standard) to the power output circuit 305 or the controller 307.

In operation 629, according to an embodiment of the disclosure, the wireless power transmission device 101 may transmit the second rating information corresponding to the second input power to the wireless power reception device 195. For example, the wireless power transmission device 101 may control at least one communication module (e.g., the first communication module 308 and/or the second communication module 309) to transmit the second signal including the second rating information to the wireless power reception device 195.

In operation 631, according to an embodiment of the disclosure, the wireless power reception device 195 (e.g., the controller 407 or the AP) may determine a second charging current, based on the second rating information received from the wireless power transmission device 101. The second charging current may be a maximum allowable current for charging the battery of the wireless power reception device 195.

In operation 633, according to an embodiment of the disclosure, the wireless power reception device 195 may request a second power from the wireless power transmission device 101. For example, the wireless power reception device 195 may control at least one communication module (e.g., the first communication module 408 and/or the second communication module 409) to transmit information (or a second power request signal including information on the second charging current) on the second charging current to the wireless power transmission device 101.

In operation 635, according to an embodiment of the disclosure, the wireless power transmission device 101 may apply a second output power to the transmission coil 310, based on the information (or the second power request signal including the information on the second charging current) on the second charging current received from the wireless power reception device 195.

In operation 637, according to an embodiment of the disclosure, the wireless power transmission device 101 may transmit the second power to the wireless power reception device 195 by applying the second output power to the transmission coil 310.

According to an embodiment of the disclosure, the wireless power reception device 195 may charge the battery while satisfying a rated current, based on the second power received from the wireless power transmission device 101.

Figure 7:
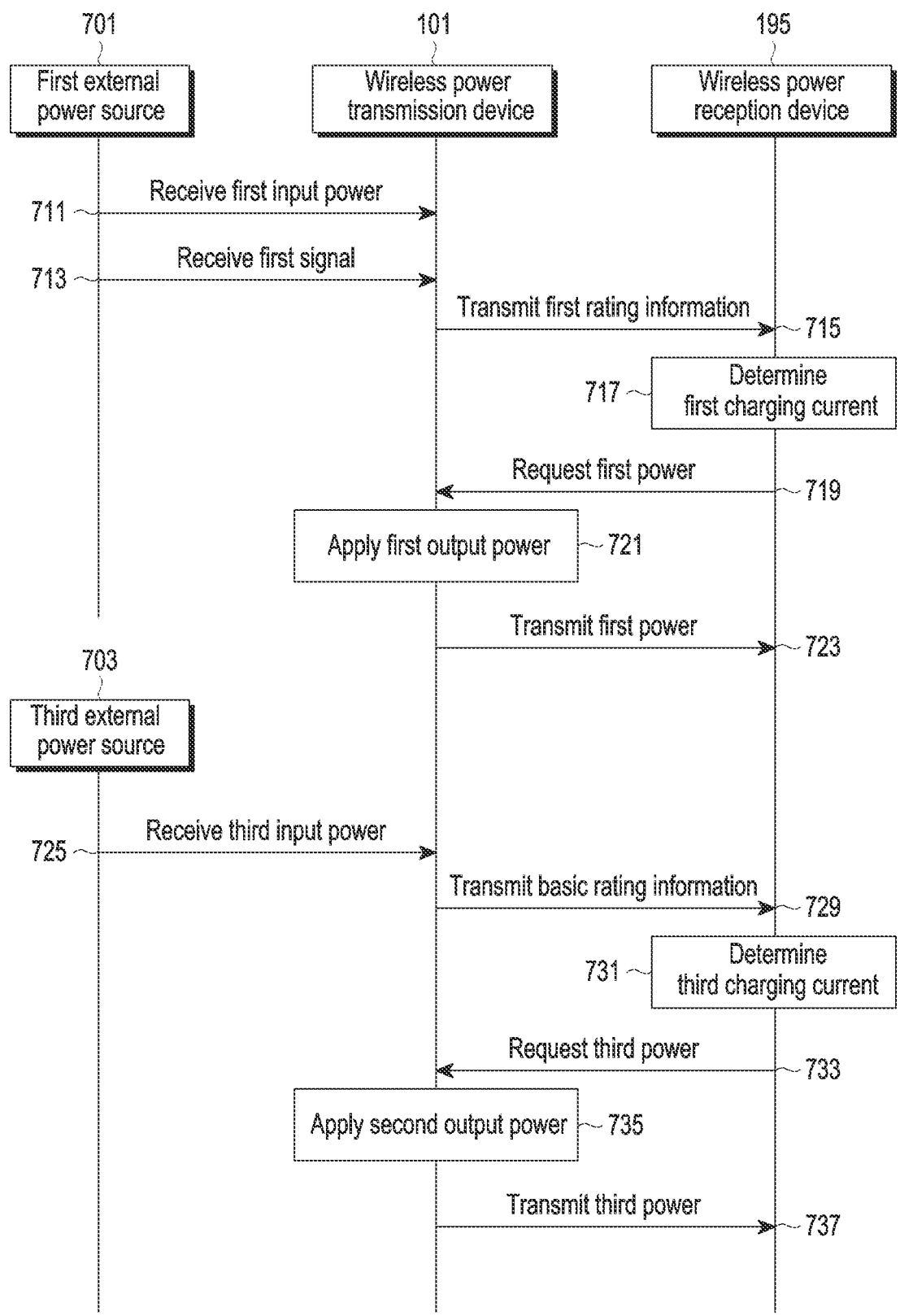
FIG. 7 is a flowchart illustrating a method of operating a device included in a wireless power transmission system according to an embodiment of the disclosure.

FIG. 7 is a flowchart illustrating a method of operating a device included in a wireless power transmission system according to an embodiment of the disclosure. FIG. 7 will be described with reference to FIGS. 2, 3A, 3B, 4, and 5.

Among the operations of FIG. 7, some descriptions of operations similar to the operations of FIG. 5 or the operations of FIG. 6 may be omitted, and the omitted descriptions may be understood similarly to the descriptions of FIG. 5 or the descriptions of FIG. 6.

A first external power source 701 and a third external power source 703 of FIG. 7 may be one type of the external power source 200 of FIG. 2.

Referring to FIG. 7, in operation 711, according to an embodiment of the disclosure, the wireless power transmission device 101 (e.g., the controller 307) may receive a first input power from the first external power source 701. The wireless power transmission device 101 may receive the first input power from the first external power source 701 through the first power input circuit 301 (e.g., a power input circuit implemented in accordance with the PD standard or the BC1.2 standard). The wireless power transmission device 101 may identify that the first input power is received from the first external power source 701 through the first power input circuit 301 (e.g., a power input circuit implemented in accordance with the PD standard or the BC1.2 standard).

In operation 713, according to an embodiment of the disclosure, the wireless power transmission device 101 may receive a first signal related to the first input power from the first external power source 701 through the first power input circuit 301 (e.g., a power input circuit implemented in accordance with the PD standard or the BC1.2 standard).

According to an embodiment of the disclosure, the wireless power transmission device 101 may identify first rating information corresponding to the first input power, based on the first signal related to the first input power. For example, the first power input circuit 301 (e.g., a power input circuit implemented in accordance with the PD standard or the BC1.2 standard) may identify the first rating information corresponding to the first input power, based on the first signal related to the first input power received from the first external power source 701.

According to an embodiment of the disclosure, the wireless power transmission device 101 may identify that the first input power is received through the first power input circuit 301 (e.g., a power input circuit implemented in accordance with the PD standard or the BC1.2 standard), based on a signal (e.g., a signal including the first rating information) transmitted from the first power input circuit 301 (e.g., a power input circuit implemented in accordance with the PD standard or the BC1.2 standard) to the power output circuit 305 or the controller 307. The wireless power transmission device 101 may identify that the first signal related to the first input power is received through the first power input circuit 301 (e.g., a power input circuit implemented in accordance with the PD standard or the BC1.2 standard), based on a signal (e.g., a signal including the first rating information) transmitted from the first power input circuit 301 (e.g., a power input circuit implemented in accordance with the PD standard or the BC1.2 standard) to the power output circuit 305 or the controller 307. For another example, the wireless power transmission device 101 may identify the first rating information corresponding to the first input power, based on a signal (e.g., a signal including the first rating information) transmitted from the first power input circuit 301 (e.g., a power input circuit implemented in accordance with the PD standard or the BC1.2 standard) to the power output circuit 305 or the controller 307.

In operation 715, according to an embodiment of the disclosure, the wireless power transmission device 101 may transmit the first rating information corresponding to the first input power to the wireless power reception device 195. For example, the wireless power transmission device 101 may control at least one communication module (e.g., the first communication module 308 and/or the second communication module 309) to transmit a signal including the first rating information to the wireless power reception device 195.

In operation 717, according to an embodiment of the disclosure, the wireless power reception device 195 (e.g., the controller 407 or the AP) may determine a first charging current, based on the first rating information received from the wireless power transmission device 101. The first charging current may be a maximum allowable current for charging the battery of the wireless power reception device 195.

In operation 719, according to an embodiment of the disclosure, the wireless power reception device 195 may request a first power from the wireless power transmission device 101. For example, the wireless power reception device 195 may control at least one communication module (e.g., the first communication module 408 and/or the second communication module 409) to transmit information (or a first power request signal including information on the first charging current) on the first charging current to the wireless power transmission device 101.

In operation 721, according to an embodiment of the disclosure, the wireless power transmission device 101 may apply a first output power to the transmission coil 310, based on the information (or the first power request signal including the information on the first charging current) on the first charging current received from the wireless power reception device 195.

In operation 723, according to an embodiment of the disclosure, the wireless power transmission device 101 may transmit the first power to the wireless power reception device 195 by applying the first output power to the transmission coil 310.

According to an embodiment of the disclosure, the wireless power reception device 195 may charge the battery while satisfying a rated current, based on the first power received from the wireless power transmission device 101.

In operation 725, according to an embodiment of the disclosure, the wireless power transmission device 101 may receive a third input power from the third external power source 703 (e.g., an on the go (OTG) device or a non-rated device). The wireless power transmission device 101 may receive the third input power from the third external power source 703 through the first power input circuit 301 or the second power input circuit 303. The wireless power transmission device 101 may identify that the third input power is received from the third external power source 703 through the first power input circuit 301 or the second power input circuit 303.

According to an embodiment of the disclosure, the third external power source 703 may not transmit a signal related to input power to the wireless power transmission device 101. The wireless power transmission device 101 may not receive a signal related to the third input power from the third external power source 703. The wireless power transmission device 101 may identify basic rating information as rating information, based on the signal related to the third input power not being received through the first power input circuit 301 or the second power input circuit 303.

According to an embodiment of the disclosure, the wireless power transmission device 101 may identify that the third input power is received through the first power input circuit 301 or the second power input circuit 303, based on a signal (e.g., a signal including the basic rating information) transmitted from the first power input circuit 301 or the second power input circuit 303 to the power output circuit 305 or the controller 307.

In operation 729, according to an embodiment of the disclosure, the wireless power transmission device 101 may transmit the basic rating information to the wireless power reception device 195, based on the signal related to the third input power not being received. For example, the wireless power transmission device 101 may control at least one communication module (e.g., the first communication module 308 and/or the second communication module 309) to transmit a signal including the basic rating information to the wireless power reception device 195.

In operation 731, according to an embodiment of the disclosure, the wireless power reception device 195 (e.g., the controller 407 or the AP) may determine a third charging current (e.g., a basic charging current), based on the basic rating information received from the wireless power transmission device 101. The third charging current (e.g., a basic charging current) may be a maximum allowable current (a basic maximum allowable current) for charging the battery of the wireless power reception device 195.

In operation 733, according to an embodiment of the disclosure, the wireless power reception device 195 may request a third power from the wireless power transmission device 101. For example, the wireless power reception device 195 may control at least one communication module (e.g., the first communication module 408 and/or the second communication module 409) to transmit information (or a third power request signal including information on the third charging current) on the third charging current to the wireless power transmission device 101.

In operation 735, according to an embodiment of the disclosure, the wireless power transmission device 101 may apply a third output power to the transmission coil 310, based on the information (or the third power request signal including the information on the third charging current) on the third charging current received from the wireless power reception device 195.

In operation 737, according to an embodiment of the disclosure, the wireless power transmission device 101 may transmit the third power to the wireless power reception device 195 by applying the third output power to the transmission coil 310.

According to an embodiment of the disclosure, the wireless power reception device 195 may charge the battery, based on the third power received from the wireless power transmission device 101.

Figure 8:
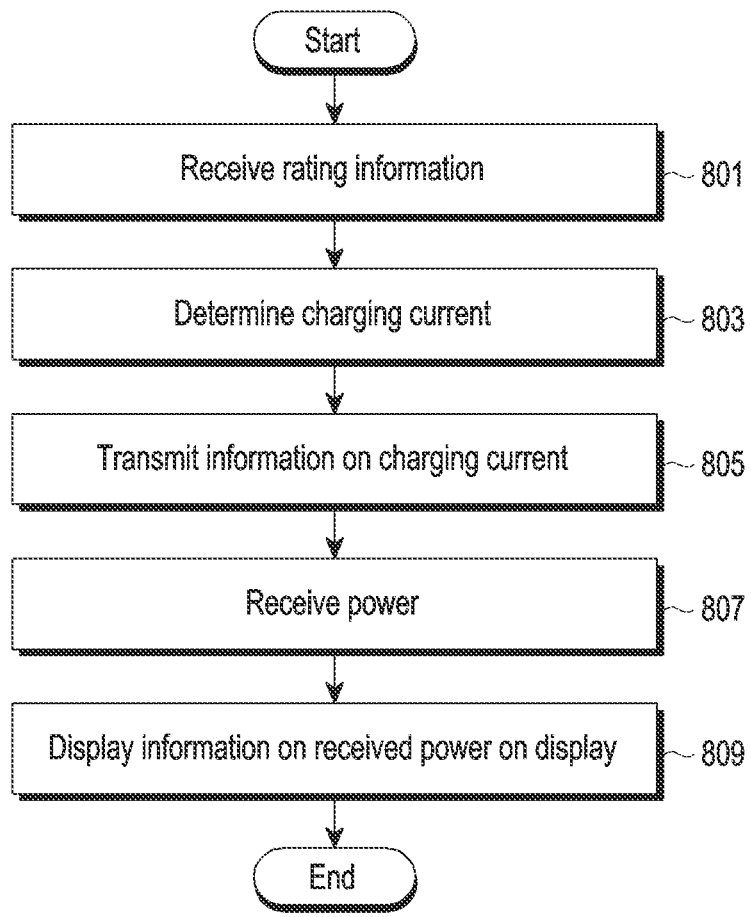
FIG. 8 is a flowchart illustrating a method of operating a wireless power reception device according to an embodiment of the disclosure.

FIG. 8 is a flowchart illustrating a method of operating a wireless power reception device according to an embodiment of the disclosure. FIG. 8 will be described with reference to FIGS. 2, 3A, 3B, 4, 5, 6, and 7.

Referring to FIG. 8, in operation 801, according to an embodiment of the disclosure, the wireless power reception device 195 (e.g., the controller 407 or an AP) may receive, from the wireless power transmission device 101 (e.g., the controller 307), rating information corresponding to input power input to the wireless power transmission device 101.

In operation 803, according to an embodiment of the disclosure, the wireless power reception device 195 may determine a charging current, based on the rating information received from the wireless power transmission device 101.

In operation 805, according to an embodiment of the disclosure, the wireless power reception device 195 may transmit information on the charging current to the wireless power transmission device 101. Alternatively, the wireless power reception device 195 may transmit a power request signal including the information on the charging current to the wireless power transmission device 101. For example, the wireless power reception device 195 may control at least one communication module (e.g., the first communication module 408 and/or the second communication module 409) to transmit the information (or the power request signal including the information on the charging current) on the charging current to the wireless power transmission device 101.

In operation 807, according to an embodiment of the disclosure, the wireless power reception device 195 may receive power from the wireless power transmission device 101. For example, the wireless power reception device 195 may receive power corresponding to the information (or the power request signal including the information on the charging current) on the charging current from the wireless power transmission device 101. The wireless power reception device 195 may charge the battery, based on the received power.

In operation 809, according to an embodiment of the disclosure, the wireless power reception device 195 may display information on the received power on the display 403. The "information on the received power" may be information on power received from the wireless power transmission device 101. For example, the information on the received power may be information (e.g., a phrase, a color, an icon, and an expected charging time) indicating whether the power received from the wireless power transmission device 101 is power of recommended specification or power of non-recommended specification. According to an embodiment of the disclosure, the wireless power reception device 195 may identify whether the power received from the wireless power transmission device 101 is power of recommended specification or power of non-recommended specification, based on the rating information received in operation 801 or the power received in operation 807. For example, the wireless power reception device 195 may display information on the received power received from the wireless power transmission device 101 on the display 403, based on the rating information received in operation 801 or the power received in operation 807. For example, when the power received from the wireless power transmission device 101 is the power of recommended specification, the wireless power reception device 195 may display, on the display 403, a phrase indicating recommended specification, a color indicating recommended specification, an icon indicating recommended specification, or an expected charging time when charging with recommended specification. For example, when the power received from the wireless power transmission device 101 is the power of non-recommended specification, the wireless power reception device 195 may display, on the display 403, a phrase indicating non-recommended specification, a color indicating non-recommended specification, an icon indicating non-recommended specification, or an expected charging time when charging with non-recommended specification.

FIG. 9 illustrates rating information and a charging current according to an embodiment of the disclosure.

FIG. 9 illustrates a charging current (e.g., a maximum allowable current) (e.g., RX Max Load SET) in the wireless power reception device 195 according to specification (e.g., an input voltage and an input current) of input power input to the wireless power transmission device 101. For example, when a voltage of the input power input to the wireless power transmission device 101 is 5V and a current thereof is 2 A, a charging current (e.g., a maximum allowable current) in the wireless power reception device 195 may be 1.2 A. For example, when a voltage of the input power input to the wireless power transmission device 101 is 5V and a current thereof is not identified (e.g., unknown), a charging current (e.g., a maximum allowable current) in the wireless power reception device 195 may be 0.3 A. The wireless power reception device 195 (e.g., the controller 407 or the AP) may identify a charging current (e.g., a maximum allowable current), based on rating information of FIG. 9. The rating information of FIG. 9 is only an example, and a value of the rating information is not limited. For example, in the rating information of FIG. 9, only the case where an input voltage is 5V is disclosed, but an input voltage may be 5V, 9V, 15V, or 20V and those skilled in the art may understand that an input voltage and an input current are not limited.

FIG. 10 illustrates a packet transmitted from a wireless power reception device according to an embodiment of the disclosure.

Referring to FIG. 10, according to an embodiment of the disclosure, the wireless power reception device 195 may transmit a packet to the wireless power transmission device 101 through in-band communication. For example, the wireless power reception device 195 may transmit a signal inquiring rating information of input power to the wireless power transmission device 101 by using a "Request Guaranteed Power" packet. For example, the wireless power reception device 195 may transmit information (or a power request signal including information on a charging current) on a charging current to the wireless power transmission device 101 by using a "WPC SET" packet.

Those skilled in the art may understand that FIG. 10 is exemplary.

FIG. 11 illustrates a packet transmitted from a wireless power transmission device according to an embodiment of the disclosure.

Referring to FIG. 11, according to an embodiment of the disclosure, the wireless power transmission device 101 may transmit a packet to the wireless power reception device 195 via in-band communication. For example, the wireless power transmission device 101 may transmit rating information of input power to the wireless power reception device 195 by using a "Guaranteed Power" packet. For example, the wireless power transmission device 101 may transmit configuration power information corresponding to a requested charging power to the wireless power reception device 195 by using a "SET RX POWER" packet. Referring to FIG. 11, a packet value included in the "SET RX POWER" packet or the "Guaranteed Power" packet may be understood.

Those skilled in the art may understand that FIG. 11 is exemplary.

Those skilled in the art may understand that the embodiments described herein may be organically applied to each other within the applicable range. For example, those skilled in the art may understand that at least some operations of an embodiment described herein may be omitted and applied, or at least some operations of an embodiment and at least some operations of another embodiment may be organically connected and applied.

When an input power source is applied to a conventional wireless power transmission device, the wireless power transmission device may perform wireless charging according to a designated voltage and a designated current. In this case, when an input power source below a rated recommended specification is applied to the wireless power transmission device, over current protection from the input power source may occur, or due to insufficient output of the wireless power transmission device, wireless charging may stop, wireless charging may be disconnected, wireless charging may be performed slowly, or a heating problem may occur.

The technical problems to be solved herein may not be limited to the above-mentioned technical problems, and other technical problems not mentioned may be clearly understood, through the following descriptions, by those skilled in the art to which the disclosure belongs.

According to an embodiment of the disclosure, a wireless power transmission device (e.g., the wireless power transmission device 101) configured to wirelessly transmit power to a wireless power reception device (e.g., the wireless power reception device 195) may include: at least one power input circuit (e.g., the power input circuit 304, the first power input circuit 301, and/or the second power input circuit 303) configured to receive input power from an external power source (e.g., the external power source 200, the first external power source 601, the second external power source 602, the first external power source 701, or the third external power source 703); at least one communication module (e.g., the first communication module 308 and/or the second communication module 309); a transmission coil (e.g., the transmission coil 310) configured to wirelessly transmit the power; a power output circuit (e.g., the power output circuit 305) configured to apply output power to the transmission coil; and at least one controller (e.g., the at least one controller 307). The at least one controller may be configured to identify that a first input power is received from a first external power source (e.g., the first external power source 601 or the first external power source 701) through a first power input circuit (e.g., the power input circuit 304 or the first power input circuit 301) among the at least one power input circuit. The at least one controller may be configured to control the at least one communication module to transmit first rating information corresponding to the first input power to the wireless power reception device. The at least one controller may be configured to control the at least one communication module to receive, from the wireless power reception device, information on a first charging current determined based on the first rating information in the wireless power reception device. The at least one controller may be configured to control the power output circuit so that a first output power is applied to the transmission coil, based on the information on the first charging current.

According to an embodiment of the disclosure, the first power input circuit may be configured to receive a first signal related to the first input power from the first external power source. The first power input circuit may be configured to identify the first rating information, based on the first signal.

According to an embodiment of the disclosure, the first signal may be a negotiation signal received through a communication line of the first power input circuit.

According to an embodiment of the disclosure, the at least one controller may be configured to identify that a second input power is received from a second external power source (e.g., the second external power source 602) through a second power input circuit (e.g., the second power input circuit 303) among the at least one power input circuit. The at least one controller may be configured to control the at least one communication module to transmit second rating information corresponding to the second input power to the wireless power reception device. The at least one controller may be configured to control the at least one communication module to receive, from the wireless power reception device, information on a second charging current determined based on the second rating information in the wireless power reception device. The at least one controller may be configured to control the power output circuit so that a second output power is applied to the transmission coil, based on the information on the second charging current.

According to an embodiment of the disclosure, the second power input circuit may be configured to receive a second signal related to the second input power from the second external power source through a data cable of the second power input circuit. The second power input circuit may be configured to identify the second rating information, based on the second signal.

According to an embodiment of the disclosure, the at least one controller may be configured to identify that a third input power (e.g., a third input power input from the third external power source 703) is received through the first power input circuit. The at least one controller may be configured to control the at least one communication module to transmit basic rating information to the wireless power reception device, based on a signal related to the third input power not being received through the first power input circuit.

According to embodiments of the disclosure, the at least one communication module may include a communication module configured to support in-band communication. The first rating information may be transmitted via the in-band communication. The information on the first charging current may be received via the in-band communication.

According to embodiments of the disclosure, the at least one communication module may include a communication module configured to support out-band communication. The first rating information may be transmitted via the out-band communication. The information on the first charging current may be received via the out-band communication.

According to an embodiment of the disclosure, a method of operating a wireless power transmission device (e.g., the wireless power transmission device 101) configured to wirelessly transmit power to a wireless power reception device (e.g., the wireless power reception device 195) may include identifying that a first input power is received from a first external power source (e.g., the first external power source 601 or the first external power source 701) through a first power input circuit (e.g., the first power input circuit 301) of the wireless power transmission device. The method may include controlling at least one communication module (e.g., the first communication module 308 and/or the second communication module 309) of the wireless power transmission device to transmit first rating information corresponding to the first input power to the wireless power reception device. The method may include controlling the at least one communication module to receive, from the wireless power reception device, information on a first charging current determined based on the first rating information in the wireless power reception device. The method may include controlling a power output circuit (e.g., the power output circuit 305) of the wireless power transmission device so that a first output power is applied to a transmission coil (e.g., the transmission coil 310) of the wireless power transmission device, based on the information on the first charging current.

According to an embodiment of the disclosure, the method may include receiving a first signal related to the first input power from the first external power source through the first power input circuit. The method may include identifying the first rating information, based on the first signal.

According to an embodiment of the disclosure, the first signal may be a negotiation signal received through a communication line of the first power input circuit.

According to an embodiment of the disclosure, the method may include identifying that a second input power is received from a second external power source (e.g., the second external power source 602) through a second power input circuit (e.g., the second power input circuit 303) of the wireless power transmission device. The method may include controlling the at least one communication module to transmit second rating information corresponding to the second input power to the wireless power reception device. The method may include controlling the at least one communication module to receive, from the wireless power reception device, information on a second charging current determined based on the second rating information in the wireless power reception device. The method may include controlling the power output circuit so that a second output power is applied to the transmission coil, based on the information on the second charging current.

According to an embodiment of the disclosure, the method may include receiving a second signal related to the second input power from the second external power source through a data cable of the second power input circuit. The method may include identifying the second rating information, based on the second signal.

According to an embodiment of the disclosure, the method may include identifying that a third input power (e.g., a third input power input from the third external power source 703) is received through the first power input circuit. The method may include controlling the at least one communication module to transmit basic rating information to the wireless power reception device, based on a signal related to the third input power not being received through the first power input circuit.

According to an embodiment of the disclosure, the at least one communication module may include a communication module configured to support in-band communication. The first rating information may be transmitted via the in-band communication. The information on the first charging current may be received via the in-band communication.

According to an embodiment of the disclosure, the at least one communication module may include a communication module configured to support out-band communication. The first rating information may be transmitted via the out-band communication. The information on the first charging current may be received via the out-band communication.

According to an embodiment of the disclosure, in a computer-readable recording medium storing instructions configured to perform at least one operation by at least one controller (e.g., the at least one controller 307) of a wireless power transmission device (e.g., the wireless power transmission device 101) configured to wirelessly transmit power to a wireless power reception device (e.g., the wireless power reception device 195), the at least one operation may include identifying that a first input power is received from a first external power source (e.g., the first external power source 601 or the first external power source 701) through a first power input circuit (e.g., the first power input circuit 301) of the wireless power transmission device. The at least one operation may include controlling at least one communication module (e.g., the first communication module 308 and/or the second communication module 309) of the wireless power transmission device to transmit first rating information corresponding to the first input power to the wireless power reception device. The at least one operation may include controlling the at least one communication module to receive, from the wireless power reception device, information on a first charging current determined based on the first rating information in the wireless power reception device. The at least one operation may include controlling a power output circuit (e.g., the power output circuit 305) of the wireless power transmission device so that a first output power is applied to a transmission coil (e.g., the transmission coil 310) of the wireless power transmission device, based on the information on the first charging current.

According to an embodiment of the disclosure, a wireless power reception device (e.g., the wireless power reception device 195) configured to wirelessly receive power from a wireless power transmission device (e.g., the wireless power transmission device 101) may include: a reception coil (e.g., the reception coil 410) configured to receive the power; a power reception circuit (e.g., the power reception circuit 405) configured to convert the received power into charging power; a charger circuit (e.g., the charger circuit 401) configured to receive the charging power; at least one communication module (e.g., the first communication module 408 and/or the second communication module 409); and at least one controller (e.g., the controller 407 or an AP). The at least one controller may be configured to control the at least one communication module to receive first rating information from the wireless power transmission device. The at least one controller may be configured to determine a first charging current of the charging power to be transferred to the charger circuit, based on the first rating information. The at least one controller may be configured to control the at least one communication module to transmit information on the first charging current to the wireless power transmission device. The at least one controller may be configured to receive a first power transmitted based on the information on the first charging current from the wireless power transmission device, through the reception coil.

According to an embodiment of the disclosure, the wireless power reception device may include a display (e.g., the display 403). The at least one controller may be further configured to display information on the received power on the display, based on the first rating information or the first power.

According to an embodiment of the disclosure, a method of operating a wireless power reception device (e.g., the wireless power reception device 195) configured to wirelessly receive power from a wireless power transmission device (e.g., the wireless power transmission device 101) may include controlling at least one communication module (e.g., the first communication module 408 and/or the second communication module 409) of the wireless power reception device to receive first rating information from the wireless power transmission device. The method may include determining a first charging current of charging power to be transferred to a charger circuit (e.g., the charger circuit 401) of the wireless power reception device, based on the first rating information. The method may include controlling the at least one communication module to transmit information on the first charging current to the wireless power transmission device. The method may include receiving a first power transmitted based on the information on the first charging current from the wireless power transmission device, through a reception coil (e.g., the reception coil 410) of the wireless power reception device.

According to an embodiment of the disclosure, the method may include displaying information on the received power on a display (e.g., the display 403) of the wireless power reception device, based on the first rating information or the first power.

According to an embodiment of the disclosure, in a computer-readable recording medium storing instructions configured to perform at least one operation by at least one controller (e.g., the controller 407 or an AP) of a wireless power reception device (e.g., the wireless power reception device 195) configured to wirelessly receive power from a wireless power transmission device (e.g., the wireless power transmission device 101), the at least one operation may include controlling at least one communication module (e.g., the first communication module 408 and/or the second communication module 409) of the wireless power reception device to receive first rating information from the wireless power transmission device. The at least one operation may include determining a first charging current of charging power to be transferred to a charger circuit (e.g., the charger circuit 401) of the wireless power reception device, based on the first rating information. The at least one operation may include controlling the at least one communication module to transmit information on the first charging current to the wireless power transmission device. The at least one operation may include receiving a first power transmitted based on the information on the first charging current from the wireless power transmission device, through a reception coil (e.g., the reception coil 410) of the wireless power reception device.

A wireless power transmission device (e.g., the wireless power transmission device 101), a wireless power reception device (e.g., the wireless power reception device 195), and a method for wirelessly transmitting power according to an embodiment can provide an effect of enabling smooth wireless charging even when the wireless power transmission device (e.g., the wireless power transmission device 101) is connected to various input power sources below a rated recommended specification and used.

The effects obtainable from the disclosure may not be limited to the above-mentioned effects, and other effects not mentioned may be clearly understood, through the following descriptions, by those skilled in the art to which the disclosure belongs.

The device according to embodiments may be one of various types of devices. The devices may include, for example, a portable communication device (e.g., a smartphone), a computer device, a portable multimedia device, a portable medical device, a camera, a wearable device, or a home appliance. According to an embodiment of the disclosure, the devices are not limited to those described above.

It should be appreciated that embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment of the disclosure, the module may be implemented in a form of an application-specific integrated circuit (ASIC).

Embodiments as set forth herein may be implemented as software (e.g., the program) including one or more instructions that are stored in a storage medium (e.g., an internal memory or an external memory) that is readable by a machine (e.g., the wireless power transmission device 100). For example, a processor (e.g., the processor 201) of the machine (e.g., the wireless power transmission device 100) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to embodiments of the disclosure, each component (e.g., a module or a program) of the above-described components may include a single entity or multiple entities, and some of the multiple entities may be separately disposed in different components. According to embodiments of the disclosure, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A wireless power transmission device configured to wirelessly transmit power to a wireless power reception device, the wireless power transmission device comprising:

at least one power input circuit configured to receive input power from an external power source;

at least one communication module;

a transmission coil configured to wirelessly transmit the power;

a power output circuit configured to apply output power to the transmission coil;
at least one processor; and
memory storing instructions,
wherein the instructions, when executed by at least one processor, cause the wireless power transmission device to:
identify that a first input power is received from a first external power source through a first power input circuit among the at least one power input circuit,
control the at least one communication module to transmit first rating information corresponding to the first input power to the wireless power reception device, the first rating information including a designated voltage and a designated current, or information indicating that the first rating information is unidentified,
control the at least one communication module to receive, from the wireless power reception device, information on a first charging current determined based on the first rating information in the wireless power reception device, wherein, when the first rating information is unidentified, the first charging current is set to a pre-specified amount of amps,
control the power output circuit so that a first output power is applied to the transmission coil, based on the information on the first charging current,
identify that a second input power is received from a second external power source through a second power input circuit among the at least one power input circuit,
control the at least one communication module to transmit second rating information corresponding to the second input power to the wireless power reception device,
control the at least one communication module to receive, from the wireless power reception device, information on a second charging current determined based on the second rating information in the wireless power reception device, and
control the power output circuit so that a second output power is applied to the transmission coil, based on the information on the second charging current.

2. The wireless power transmission device of claim 1, wherein the first power input circuit is configured to:
receive a first signal related to the first input power from the first external power source; and
identify the first rating information, based on the first signal.

3. The wireless power transmission device of claim 2, wherein the first signal is a negotiation signal received through a communication line of the first power input circuit.

4. The wireless power transmission device of claim 1, wherein the second power input circuit is configured to:
receive a second signal related to the second input power from the second external power source through a data cable of the second power input circuit; and
identify the second rating information, based on the second signal.

5. The wireless power transmission device of claim 1, wherein the instructions, when executed by at least one processor, cause the wireless power transmission device to:
identify that a third input power is received through the first power input circuit; and
control the at least one communication module to transmit basic rating information to the wireless power reception device, based on a signal related to the third input power not being received through the first power input circuit.

6. The wireless power transmission device of claim 1, wherein the at least one communication module comprises a communication module configured to support in-band communication,
wherein the first rating information is transmitted via the in-band communication, and
wherein the information on the first charging current is received via the in-band communication.

7. The wireless power transmission device of claim 1, wherein the at least one communication module comprises a communication module configured to support out-band communication,
wherein the first rating information is transmitted via the out-band communication, and
wherein the information on the first charging current is received via the out-band communication.

8. The wireless power transmission device of claim 1, wherein the first rating information includes information indicating that input power of 2.5 W is input through an on the go (OTG) protocol.

9. A method of operating a wireless power transmission device configured to wirelessly transmit power to a wireless power reception device, the method comprising:
identifying that a first input power is received from a first external power source through a first power input circuit of the wireless power transmission device;
controlling at least one communication module of the wireless power transmission device to transmit first rating information corresponding to the first input power to the wireless power reception device, the first rating information including a designated voltage and a designated current, or information indicating that the first rating information is unidentified;
controlling the at least one communication module to receive, from the wireless power reception device, information on a first charging current determined based on the first rating information in the wireless power reception device, wherein, when the first rating information is unidentified, the first charging current is set to a pre-specified amount of amps;
controlling a power output circuit of the wireless power transmission device so that a first output power is applied to a transmission coil of the wireless power transmission device, based on the information on the first charging current;
identifying that a second input power is received from a second external power source through a second power input circuit of the wireless power transmission device;
controlling the at least one communication module to transmit second rating information corresponding to the second input power to the wireless power reception device;
controlling the at least one communication module to receive, from the wireless power reception device, information on a second charging current determined based on the second rating information in the wireless power reception device; and
controlling the power output circuit so that a second output power is applied to the transmission coil, based on the information on the second charging current.

10. The method of claim 9, further comprising:
receiving a first signal related to the first input power from the first external power source through the first power input circuit; and identifying the first rating information, based on the first signal.

11. The method of claim 10, wherein the first signal is a negotiation signal received through a communication line of the first power input circuit.

12. The method of claim 9, further comprising:
receiving a second signal related to the second input power from the second external power source through a data cable of the second power input circuit; and
identifying the second rating information, based on the second signal.

13. The method of claim 9, further comprising:
identifying that a third input power is received through the first power input circuit; and
controlling the at least one communication module to transmit basic rating information to the wireless power reception device, based on a signal related to the third input power not being received through the first power input circuit.

14. The method of claim 9,
wherein the at least one communication module comprises a communication module configured to support in-band communication,
wherein the first rating information is transmitted via the in-band communication, and
wherein the information on the first charging current is received via the in-band communication.

15. The method of claim 9,
wherein the at least one communication module comprises a communication module configured to support out-band communication,
wherein the first rating information is transmitted via the out-band communication, and
wherein the information on the first charging current is received via the out-band communication.

16. A wireless power reception device configured to wirelessly receive power from a wireless power transmission device, the wireless power reception device comprising:
a reception coil configured to wirelessly receive the power;
a power reception circuit configured to convert the received power into charging power;
a charger circuit configured to receive the charging power;
at least one communication module;
at least one processor; and
memory storing instructions,
wherein the instructions, when executed by at least one processor, cause the wireless power transmission device to:
control the at least one communication module to receive first rating information from the wireless power transmission device, the first rating information including a designated voltage and a designated current, or information indicating that the first rating information is unidentified,
determine a first charging current of the charging power to be transferred to the charger circuit, based on the first rating information,
control the at least one communication module to transmit information on the first charging current to the wireless power transmission device, wherein, when the first rating information is unidentified, the first charging current is set to a pre-specified amount of amps,
receive a first power transmitted based on the information on the first charging current from the wireless power transmission device, through the reception coil,
control the at least one communication module to receive second rating information from the wireless power transmission device,
determine a second charging current of the charging power to be transferred to the charger circuit, based on the second rating information,
control the at least one communication module to transmit information on the second charging current to the wireless power transmission device, and
receive a second power transmitted based on the information on the second charging current from the wireless power transmission device, through the reception coil.

17. The wireless power reception device of claim 16, further comprising:
a display,
wherein the at least one processor is further configured to display information on the received power on the display, based on the first rating information or the first power.

18. The wireless power reception device of claim 17,
wherein the at least one processor is further configured to display information on the received power on the display, based on the second rating information or the second power.

19. The wireless power reception device of claim 17,
wherein the at least one processor is further configured to display, on the display, information indicating whether the received power is power of a recommended specification or power of a non-recommended specification, and
wherein the displayed information indicating whether the received power is power of the recommended specification or power of the non-recommended specification comprises at least one of a phrase or an icon.

20. The wireless power reception device of claim 17,
wherein the at least one processor is further configured to display, on the display, information indicating an expected charging time.

* * * * *